United States Patent Office.

JOSHUA ELLINGWOOD, OF OWENSBOROUGH, KENTUCKY.

Letters Patent No. 108,773, dated November 1, 1870.

IMPROVEMENT IN FERMENTING ALCOHOLIC LIQUORS FROM GRAIN.

*The Schedule referred to in these Letters Patent and making part of the same.*

Be it known that I, JOSHUA ELLINGWOOD, of the town of Owensborough, in the county of Daviess, in the State of Kentucky, have invented certain valuable Improvements in the Fermentation for Alcoholic Liquors from Grain, Grapes, Apples, and other substances capable of yielding such liquors by fermentation, the same being an improvement on Letters Patent No. 95,574, granted me on the 5th of October, 1869; and I hereby declare that the following is a full, clear, and exact description of my said improved process on said Letters Patent, as above mentioned.

The nature of my invention consists—

First, in the use of lime or other material, no matter what the said material may be, that may be used in proportion and time, so as to prevent putrefaction of the organic material used in fermenting for alcoholic liquors, the same not being fully set forth in said patent No. 95,574, by this means increasing the yield of alcohol from a given quantity of grain, fruit, or other substances used for said purpose.

Second, in not scalding the meal or other substances used for the production of alcohol, such scalding converting the starch into gluten, thus preventing the diastase from converting the starch into saccharine matter; instead of which I am enabled to bring the starch in contact with the diastase at a temperature required, so as to convert the starch into saccharine matter or grape sugar, thus largely increasing the yield of alcohol from a given quantity of grain, grape, or other substances used for same.

To enable others skilled in the art to make and use my improved process, I will proceed to describe the same.

My improvement may be used in either sweet or sour-mash process.

In all cases, immediately after the scalding-tub or fermenting tub is empty, wash it thoroughly, then whitewash it heavily with lime.

To secure three to four gallons of spirits to the bushel of corn or fruit, use nothing but sound material.

Take four to five pounds of malt, three to four pounds of rye to the bushel of meal. After the fluids are in the scalding-tub add to the said fluids three to five pounds lime, to prevent the putrefaction. Then add the meal. Mix well. Let stand twelve hours. Then add malt and rye. Break up with care. Set ferment if possible with fresh stiller's yeast; if not possible use pot-ale, being careful that the same is not acid. If acid, correct the same with lime.

Let them ferment at a temperature of from 70° to 100°, adding lime from time to time, as needed, to prevent putrefaction or acidity from taking place, or to arrest putrefaction after it has set up fermentation, so as to secure five to six gallons of spirits to the bushel of material used.

Take sixty bushels of meal, four hundred and eighty pounds malt—say eight pounds malt to the bushel of meal. Take water, say eighteen hundred gallons or about, at a temperature of 160°. Place this in the fermenting-tub. Add five pounds lime, then add the meal and malt. Mix with care. Let the same stand from eight to twelve hours, keeping the temperature at 160° with hot water to increase the heat, or lime to decrease the heat; for the said heat, if it takes place, is caused by putrefaction of the organic material. Let this mixture stand. At the end of twelve hours add the balance of water—say, making in all twenty-eight hundred gallons, or the amount of fluids allowed by law for fermenting sixty bushels of meal, bringing the temperature of the mixture to from 70° to 100°. If there are no signs of putrefaction or acidity add more lime. Then add five to eight pounds of rye to the bushel of meal used. Break up with care. Then add the yeast. Let the yeast be fresh stiller's yeast if possible; if not possible, take pot-ale, being careful that there is no acidity. If there are any indications of acidity in the ale, correct same with lime before adding it to the ale. Let it ferment, adding more lime slaked in water from time to time, thus preventing putrefaction of the organic material, or acidity.

The instant the tubs are emptied wash them well, and instantly or immediately heavily whitewash with lime.

Fermentation having been completed, the formation of alcohol has also been completed, but the alcohol remains in the mash, and to separate it from the refuse material then I use the usual mode, or the mode set forth in patent No. 95,574, granted me 5th of October 1869.

What I claim as new, and desire to secure by Letters Patent, is—

1. The process of applying lime or other material to the ferment at the stages of that process, and for the object and purposes substantially as described and set forth.

2. The mode, manner, and process of applying and uniting the diastase in the malt with the starch, for the object substantially as described and set forth.

3. The described process of conducting alcoholic fermentation and distillation as a whole, substantially as described and set forth.

JOSHUA ELLINGWOOD.

Witnesses:
LEM. S. FORD,
DE FORD.